United States Patent [19]

Tozer

[11] Patent Number: 4,798,392

[45] Date of Patent: Jan. 17, 1989

[54] HOLLOW METALLIC SEALING RING

[75] Inventor: Michael J. C. Tozer, Northumberland, England

[73] Assignee: Heat Transfer Technology Ltd. (Jersey), Jersey, Channel Islands, Channel Islands

[21] Appl. No.: 112,315

[22] Filed: Oct. 23, 1987

Related U.S. Application Data

[63] Continuation-in-part of Ser. No. 045,438, May 4, 1987, abandoned.

[30] Foreign Application Priority Data

Apr. 28, 1987 [GB] United Kingdom ................. 8710042

[51] Int. Cl.4 ............................................. F16J 15/08
[52] U.S. Cl. ................... 277/200; 277/206 B; 277/236
[58] Field of Search .................. 277/200, 205, 206 R, 277/212 R, 212 C, 236

[56] References Cited

U.S. PATENT DOCUMENTS

| 2,474,493 | 6/1949 | Phillips | 277/200 X |
| 3,192,690 | 7/1965 | Taylor | 277/236 X |
| 3,204,971 | 9/1965 | Meriano | 277/206 R X |
| 3,595,588 | 7/1971 | Rode | 277/206 R |
| 3,751,048 | 8/1973 | Rode | 277/200 X |
| 3,797,836 | 3/1974 | Halling | 277/200 X |
| 4,121,843 | 10/1978 | Halling | 277/200 |

Primary Examiner—Robert S. Ward
Attorney, Agent, or Firm—Franklin D. Wolffe; Morris Fidelman

[57] ABSTRACT

A hollow metallic sealing ring which in radial cross-section is of serpentine shape with a pair of divergent limbs connected by at least one contiguous single loop with substantially straight sides. The transition curve between the sides of the loop and the divergent limbs is of constant radius and the free ends of the limbs are straight and substantially parallel.

8 Claims, 3 Drawing Sheets

HOLLOW METALLIC SEALING RING

REFERENCE TO RELATED APPLICATIONS

This application is a continuation-in-part of application Ser. No. 045,438, filed May 4, 1987, now abandoned.

BACKGROUND AND SUMMARY OF THE INVENTION

This invention relates to hollow metallic sealing rings of the so-called low-load self-energizing static kind as used for instance in pumps, motors and other apparatus to form leak-proof seals between opposed, usually plane, parallel surfaces.

Conventional metallic sealing rings for this purpose are of 'C' or 'O' shaped radial cross-section but these have a major disadvantage in that they have a high spring rate and for many applications when the seal must have a large diameter the resultant compressive loads required are extremely high and not suited to the relatively weak flanges such as are used, for example, on aero engines.

Difficulties also arise when the gap to be sealed between surfaces or flanges is relatively large as happens with certain engines because of the need to cater for the manufacturing tolerances in assembly of the various parts of the engine which determine the relative position of the flanges. Further, this accumulated tolerance is compounded by differential expansion of the flanges both longitudinally and radially. There is therefore constant movement as the engine temperature varies from cold to hot and sealing contact points are not of constant diameter. The sealing ring must accordingly be sufficiently resilient to cope with large amounts of radial and axial expansion and contraction.

To this end, various forms of sealing ring which, in radial section, are of concertina or bellows-shaped profile have been proposed and comprise two outer limbs, intended to engage the surfaces or flanges to be seated connected by one or more contiguous loops. Typical examples of such metallic sealing rings are those which are disclosed in U.S. Pat. Nos. 3,575,432, 3,797,836 and 4,121,843. In each of those examples, the outer limbs are of sinuous configuration with curved extremities which make line contact with the surfaces or flanges to be sealed.

The present invention has been devised with the object of providing a sealing ring which has a superior performance compared with the sealing rings which have been hitherto proposed and/or used.

In accordance with the present invention, a hollow metallic seal is of serpentine radial cross-section comprised of a pair of divergent limbs which are contiguous with a loop formation having at least one straight-sided loop. The transition curve between the sides of said loop and the divergent limbs being of constant radius and the free ends of said limbs being straight and substantially parallel. Preferably, the radius of the curved end of the loop is less than the radius of the aforesaid transition curve.

The foregoing and other objects, features and advantages of this invention will be apparent from the following, more particular, description of the preferred embodiments of this invention, as illustrated in the accompanying drawings.

DETAILED DESCRIPTIONS OF THE PREFERRED EMBODIMENTS

Figure 1:
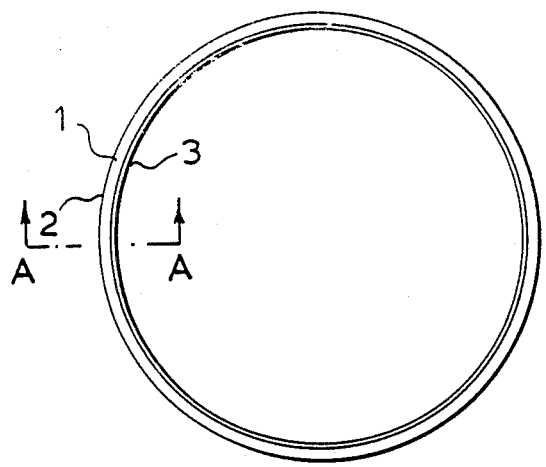
FIG. 1 is a plan view of the sealing ring.
Figure 2:
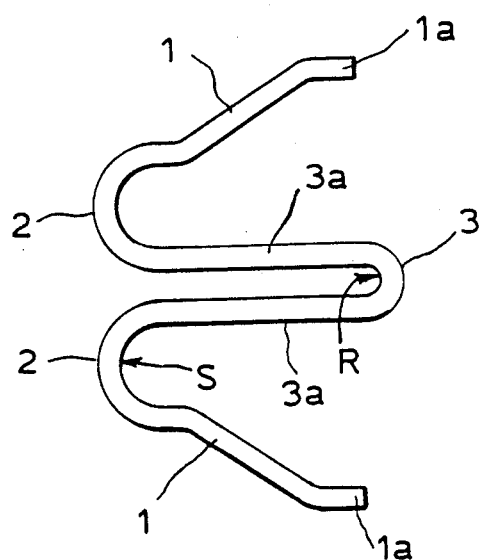
FIG. 2 is an enlarged scale radial cross-section on line A—A of FIG. 1.

Referring firstly to FIGS. 1 and 2 of the drawings, the hollow metallic sealing ring therein shown is intended for a turbine gas path aircraft engine and is made of a metal alloy known as NIMONIC 80A Specification BS 2HR 201 of thickness 0.008 0.001 inches which is formed as a circular arc with its two ends subsequently welded together. The ring is heat treated firstly for 1 hour at 925° C. 10° C. in a vacuum, then force cooled, and finally heat treated for 4 hours at 750° C. 10° in vacuum.

As shown in FIG. 2 the ring in radial cross-section is of serpentine shape with two divergent limbs 1 connected by constant radius curved transitions 2 to a central loop 3 of which the sides 3a are parallel and relatively close together. The radius R of the central part of the loop is significantly less than the radius S of the curved transitions 2, while the free ends 1a of the limbs 1 which engage the surfaces or flanges to be sealed are straight, substantially parallel, and lightly lapped and polished.

Typically the outside diameter of the ring is 10.478 inches, the axial length is 0.248 inches, the inside radius S of each transition curve 2 is 0.023 inches and the inside radius R is 0.009 inches. The length of the straight free ends 1a is 0.020 inches, the inside diameter at the free ends is 10.2 inches, the inside diameter at the loop 3 is 10.150 inches and the outside axial length of the loop 3 and the two curved transitions 2 is about 0.158 inches.

The mode of formation of the hollow metallic ring is hereafter described by reference to FIGS. 3, 3A, 3B, 3C and 3D.

Figure 3:
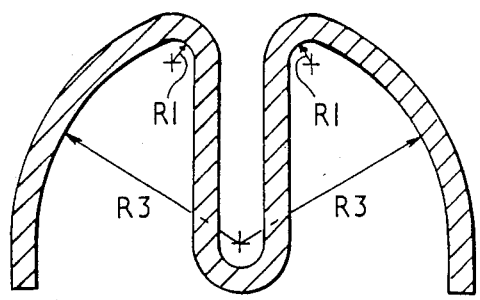
FIGS. 3, 3A, 3B, 3C and 3D are diagrammatic views to illustrate final stages in the formation of a sealing ring as shown in FIGS. 1 and 2.
Figure 3A:
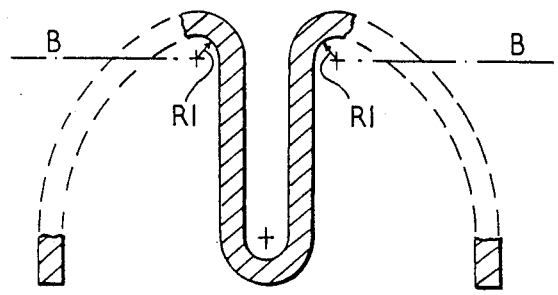
Figure 3B:
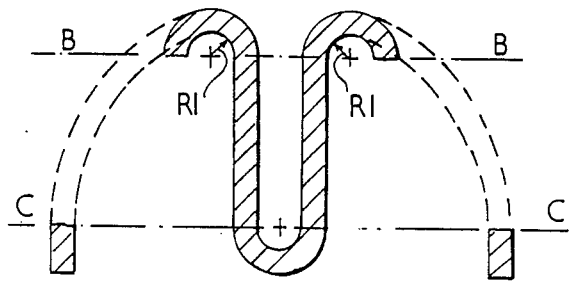
Figure 3C:
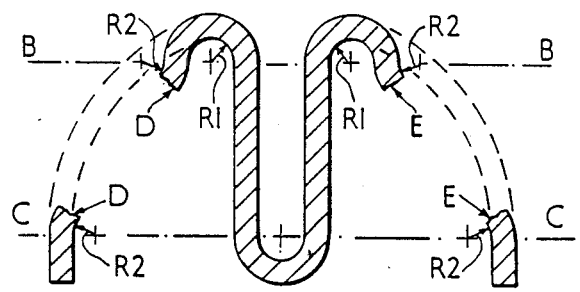

FIG. 3 shows in radial section a hollow metallic sealing ring substantially as disclosed in our co-pending patent application of the same date and which has been made in stages as described with reference to the drawings of that application. Two radii R1 and R3 are indicated, and as shown part of the ring formed by radius R3 is removed (FIG. 3A), whereby the radiused or curved part R1 is extended to a line B—B (FIG. 3B) perpendicular to the diametric plane of the ring.

A radius R2 equal to the thickness of the material of the ring is now added at line B—B and at line C—C, which is parallel thereto, to form parts DD and EE.

Figure 3D:
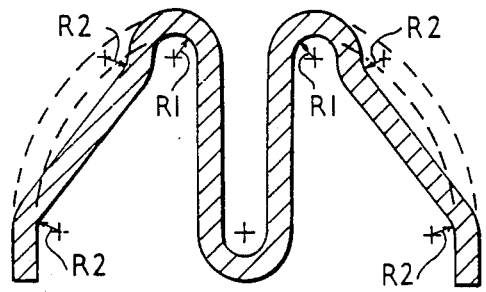

Finally, the two parts D are connected to one another as are the two parts E to achieve the final formation shown in FIG. 3D.

Figure 4:
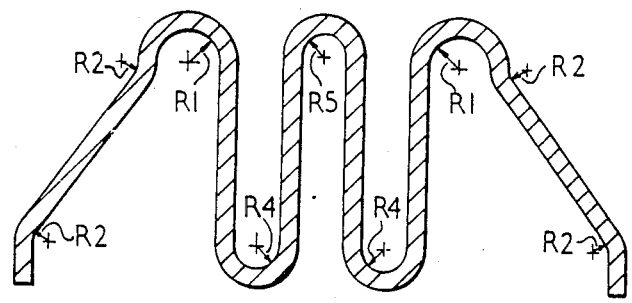
FIGS. 4, 5, 6 and 7 are cross sections of four different plural loop embodiments of the invention.

FIG. 4 shows a plural loop version of the sealing ring shown in FIGS. 2 and 3D by the addition of an extra convolution to provide two loops of equal width with two radii R1, four radii R2, two radii R4 and one radius R5; the distance between the two loops being the same as the internal width of each loop. The loops project to the same extend as the outer limbs.

Figure 5:
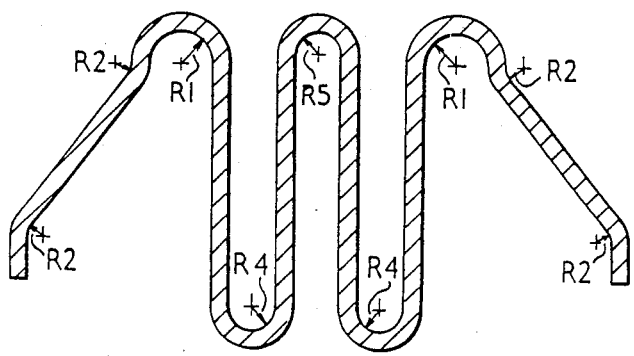

FIG. 5 shows a plural loop version of the seal ring similar to that which is shown in FIG. 4 except that, as a result of a change in the position of radius R4, the loops are elongated beyond the outer limbs.

Figure 6:
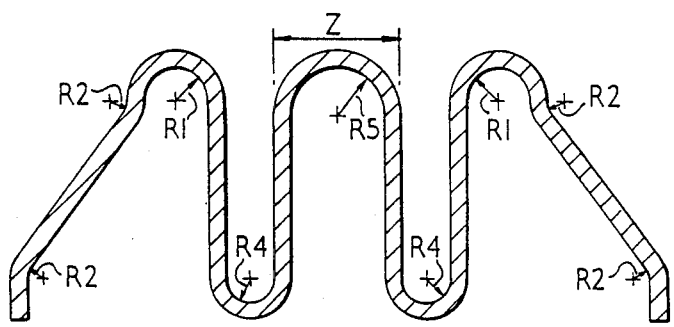

FIG. 6 shows a variation of the sealing ring shown in FIG. 4 wherein by an increase in radius R5 there is an increased bridging dimension Z between the loops which in this embodiment project to the same extent as the outer limbs.

Figure 7:
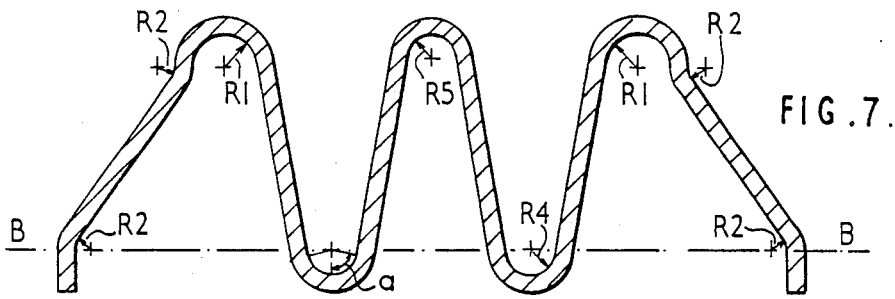

Finally, FIG. 7 shows a two loop sealing ring wherein as a result of the movement of the centers of radii R1, R4 and R5, the loops or convolutions have non-parallel sides.

In suitable circumstances the sealing ring could be made of other metals other than the one mentioned in the foregoing, such as, steel, stainless steel, or an alloy with a high nickel content using appropriate heat treatments, or the like.

While the invention has been particularly shown and described in reference to preferred embodiments thereof, it will be understood by those skilled in the art that changes in form and details may be made therein without departing from the spirit and scope of the invention.

I claim:

1. A hollow metallic sealing ring of serpentine radial cross-section, comprising of a pair of divergent limbs which are contiguous with a loop formation having at least one straight-sided loop, wherein the transition curve between the sides of said loop and said divergent limbs being of constant radius, and wherein the free ends of said limbs being straight and substantially parallel.

2. A hollow metallic sealing ring as claimed in claim 1, wherein the radius of the curved end of the loop is substantially less than the radius of the transition curve.

3. A hollow metallic sealing ring as claimed in claim 1, wherein the length of at least one loop is co-extensive with the length of the limbs.

4. A hollow metallic sealing ring as claimed in claim 1, wherein the length of at least one loop is greater than the length of the limbs.

5. A hollow metallic sealing ring as claimed in claim 1, wherein the distance between adjacent loops is substantially the same as the inside width of those loops.

6. A hollow metallic sealing ring as claimed in claim 1, wherein the distance between adjacent loops exceeds the inside width of those loops.

7. A hollow metallic sealing ring as claimed in claim 1, wherein at least one loop has parallel sides.

8. A hollow metallic sealing ring as claimed in claim 1, wherein at least one loop has divergent sides.

* * * * *